United States Patent
Rapport et al.

(10) Patent No.: US 11,305,233 B2
(45) Date of Patent: Apr. 19, 2022

(54) SYSTEM, DEVICE AND METHOD FOR PRODUCTION OF HIGH-NITROGEN ORGANIC LIQUID FERTILIZER FROM AMMONIA RICH WASTEWATERS AND DIGESTER EFFLUENTS

(71) Applicant: CleanWorld, Gold River, CA (US)

(72) Inventors: Joshua L. Rapport, San Francisco, CA (US); Caleb Adams, Folsom, CA (US)

(73) Assignee: CleanWorld, Gold River, CA (US)

( * ) Notice: Subject to any disclaimer, the term of this patent is extended or adjusted under 35 U.S.C. 154(b) by 225 days.

(21) Appl. No.: 16/431,579

(22) Filed: Jun. 4, 2019

(65) Prior Publication Data

US 2019/0367382 A1 Dec. 5, 2019

Related U.S. Application Data

(60) Provisional application No. 62/680,462, filed on Jun. 4, 2018.

(51) Int. Cl.
| | |
|---|---|
| *C02F 1/00* | (2006.01) |
| *B01D 61/14* | (2006.01) |
| *C02F 1/44* | (2006.01) |
| *C02F 1/04* | (2006.01) |
| *B01D 3/00* | (2006.01) |

(Continued)

(52) U.S. Cl.
CPC ............ *B01D 61/147* (2013.01); *C02F 1/004* (2013.01); *C02F 1/041* (2013.01); *C02F 1/444* (2013.01);

(Continued)

(58) Field of Classification Search
CPC .......... C02F 1/004; C02F 1/444; C02F 1/041; C02F 2209/06; C02F 2209/003; C02F 2201/002; C02F 2101/16; C02F 1/441; C02F 1/66; C02F 2303/22; C02F 11/04; C02F 11/125; C02F 11/122; C02F 1/20; C02F 2103/32; C02F 2303/16; C02F 9/00; C02F 2201/16; C05F 7/005; Y02W 10/20; B01D 2311/2649; B01D 61/16; B01D 61/147; B01D 61/58; B01D 2321/164; B01D 61/025; B01D 2321/02; B01D 2311/04; B01D 2311/18; B01D 2311/06; B01D 2321/08; B01D 65/02; B01D 2311/08; F25J 3/0276

(Continued)

(56) References Cited

U.S. PATENT DOCUMENTS

| | | | | |
|---|---|---|---|---|
| 2,519,451 A | * | 8/1950 | Fulton | .................. C01C 1/10 62/635 |
| 5,357,855 A | * | 10/1994 | Ishigaki | .................. B30B 9/12 100/48 |

(Continued)

OTHER PUBLICATIONS

Trygar, 2014, Understanding Alkalinity, accessed online Mar. 22, 2021 (Year: 2014).*

(Continued)

*Primary Examiner* — Allison G Fitzsimmons
(74) *Attorney, Agent, or Firm* — Haverstock & Owens, A Law Corporation (57) ABSTRACT

A method, system and device for recovering a desired nutrient from wastewater or digester effluents while separating the remaining components into various side streams which may have additional value or be suitable for inexpensive disposal due to the processing.

26 Claims, 6 Drawing Sheets

(51) Int. Cl.
- *C05F 7/00* (2006.01)
- *C02F 101/16* (2006.01)
- *C02F 11/13* (2019.01)
- *C02F 11/122* (2019.01)
- *C02F 11/125* (2019.01)

(52) U.S. Cl.
CPC ........... *C02F 11/122* (2013.01); *C02F 11/125* (2013.01); *C02F 11/13* (2019.01); *C02F 2101/16* (2013.01); *C02F 2201/002* (2013.01); *C02F 2209/003* (2013.01); *C02F 2209/06* (2013.01); *C05F 7/005* (2013.01)

(58) Field of Classification Search
USPC .......... 210/750; 95/149, 223, 227, 241, 251, 95/263, 264
See application file for complete search history.

(56) References Cited

U.S. PATENT DOCUMENTS

| | | | | |
|---|---|---|---|---|
| 6,368,849 | B1* | 4/2002 | Norddahl | C05F 17/989 435/262 |
| 9,103,193 | B2 | 8/2015 | Coli | |
| 2004/0007525 | A1* | 1/2004 | Rabie | B01D 65/08 210/636 |
| 2005/0082236 | A1* | 4/2005 | Derrick | B01D 33/0376 210/780 |
| 2008/0296232 | A1* | 12/2008 | Wegner | C02F 1/66 210/725 |
| 2010/0089740 | A1* | 4/2010 | Vuong | C02F 9/00 203/10 |
| 2011/0197988 | A1 | 8/2011 | Vilet | |
| 2011/0272158 | A1 | 11/2011 | Neal | |
| 2014/0363344 | A1* | 12/2014 | Orentlicher | C02F 1/44 422/148 |

OTHER PUBLICATIONS

Rev. Ambient. Água vol. 10 No. 2 Taubaté Apr./Jun. 2015 (Year: 2015).*

Aliku, 2017, Desalination: A Means of Increasing Irrigation Water Sources for Sustainable Crop Production, pp. 47-62. (Year: 2017).*

* cited by examiner

SYSTEM, DEVICE AND METHOD FOR PRODUCTION OF HIGH-NITROGEN ORGANIC LIQUID FERTILIZER FROM AMMONIA RICH WASTEWATERS AND DIGESTER EFFLUENTS

RELATED APPLICATIONS

This application claims priority under 35 U.S.C. § 119(e) of the U.S. provisional patent application Ser. No. 62/680,462 filed Jun. 4, 2018, and titled "METHOD FOR PRODUCTION OF HIGH-NITROGEN ORGANIC LIQUID FERTILIZER FROM AMMONIA RICH WASTEWATERS AND DIGESTER EFFLUENTS," which is hereby incorporated by reference.

FIELD OF THE INVENTION

The present invention relates to the field of wastewater and digester effluent processing. More particularly, the present invention relates to the recovery of nutrients from wastewater and/or digester effluent.

BACKGROUND OF THE INVENTION

Wastewaters from organic processes such as agricultural production and municipal wastewater treatment have been evaluated for their potential as a valuable organic fertilizer due to the presence of valuable nutrients like nitrogen, phosphorus, and potassium. However, application has been limited because of the presence of undesirable constituents, such as salts, pesticides, heavy metals, bits of plastic, inks, pathogenic microbes, and even excess water which makes transportation prohibitively expensive.

SUMMARY OF THE INVENTION

A wastewater and/or digester effluent processing system, device and method that exclusively concentrates the valuable nutrient, nitrogen, from wastewater and/or digester effluents while separating the remaining components into various side streams using physical filtration and/or thermophysical stripping.

A first aspect is directed to a method of recovering ammonia from wastewater. The method comprises filtering a first set of solids from an input slurry medium including ammonia by pressing the slurry medium through one or more screens of a screw press, wherein each subsequent one of the screens through which the slurry medium is forced has smaller apertures than the previous one of the screens, failsafe filtering a second set of solids from the input slurry medium as output by the screw press with a static bag filter and pumping resulting filtrate to one or more storage tanks, for each of a plurality of batches of the filtrate filtering a third set of solids from the batch of the filtrate without using coagulating or flocculating polymers by forcing the batch through at least one ultra-fine membrane producing a remaining permeate and cleaning the membrane after the batch has been completely filtered by flushing hot water through the membrane before a next one of the batches is forced through the membrane, adjusting a pH level of the permeate by mixing the permeate with a bicarbonate medium when the pH level is below a threshold value and pumping the adjusted permeate to one or more stripping columns via a permeate pipeline and thermo-physically recovering the ammonia from the adjusted permeate by steam stripping the adjusted permeate in one or more stripping columns thereby producing vaporized ammonia, channeling the vaporized ammonia to one or more condensing columns and condensing the vaporized ammonia in the condensing columns without acid scrubbing the vaporized ammonia.

In some embodiments, adjusting the pH level of the permeate comprises dynamically injecting the bicarbonate medium into the permeate pipeline at an injection rate, wherein the injection rate is dynamically adjusted based on a measured pH level of the permeate within the permeate pipeline after the bicarbonate medium has been injected such that the measured pH level remains above a target value. In some embodiments, the method further comprises cleaning the membrane by adjusting a pH level of the hot water to 12 with sodium hydroxide and flushing the pH adjusted hot water through the membrane. In some embodiments, the membrane is coupled together with an input and a plurality of outputs within a self-contained skid. In some embodiments, the method further comprises additional membranes, wherein the membranes are composed of material that filters suspended solids having diameters greater than between 0.01 and 0.1 microns. In some embodiments, a first screen of the screens has apertures between 0.5 to 2 millimeters in diameter and a second screen of the screens has apertures between 100 to 250 microns in diameter. In some embodiments, the static bag filter includes pores having diameters between 400 to 500 microns. In some embodiments, filtering the first set of solids further comprises running the slurry medium through a shaker deck having one or more shaker screens. In some embodiments, the method further comprises refluxing a portion of the recovered ammonia back into the stripping columns in order to increase the concentration of the recovered ammonia. In some embodiments, the steam stripping comprises generating steam from the permeate by heating the permeate with a heat exchanger coupled to the stripping columns. In some embodiments, the stripping column is cleaned by refluxing a basic and/or acidic solution through the column and associated piping to remove precipitated solids which may be organic and/or inorganic in nature. In some embodiments, the method further comprises pumping wastewater exiting the stripping columns after the ammonia has been recovered into a reverse osmosis system that separates salt from the wastewater. In some embodiments, the method further comprises cleaning the stripping columns and associated piping with acidic and/or basic solutions to remove organic and/or inorganic precipitates.

A second aspect is directed to an ammonia wastewater recovery system. The system comprises a first filtering apparatus including a screw press that filter a first set of solids from an input slurry medium including ammonia by pressing the slurry medium through one or more screens of the screw press, wherein each subsequent one of the screens through which the slurry medium is forced has smaller apertures than the previous one of the screens, a second filtering apparatus coupled with the output of the first filtering apparatus and including a sump, one or more storage tanks and a static bag filter, wherein the sump pumps the input slurry medium as output by the first filtering apparatus through the static bag filter thereby removing a second set of solids from the input slurry medium and pumps resulting filtrate output by the static bag filter into the one or more storage tanks, a third filtering apparatus coupled with the output of the storage tanks via one or more input values and including one or more output valves and at least one ultra-fine membrane, wherein for each of a plurality of batches of the filtrate received from the storage tanks the third filtering apparatus filters a third set of solids from the batch of the filtrate without using coagulating or flocculating polymers by forcing the batch through the membrane producing a remaining permeate and cleans the membrane after the batch has been completely filtered by the membranes by flushing hot water through the membranes before a next one of the batches is forced through the membrane, a pH adjustment apparatus coupled with the third filtering apparatus and including an adjustment tank and an adjustment pump, wherein the pH adjustment apparatus adjusts a pH level of the permeate by mixing the permeate with a bicarbonate medium when the pH level is below a threshold value and pumping the adjusted permeate to one or more stripping columns via a permeate pipeline and thermo-physical ammonia recovery apparatus including one or more stripping columns coupled with one or more condenser columns, wherein the recovery apparatus recovers the ammonia from the adjusted permeate by steam stripping the adjusted permeate in the one or more stripping columns thereby producing vaporized ammonia, channeling the vaporized ammonia to the one or more condensing columns and condensing the vaporized ammonia in the condensing columns without acid scrubbing the vaporized ammonia.

In some embodiments, the adjustment apparatus comprises an injection line coupled with the permeate pipeline and a pH sensor, and further wherein adjusting the pH level of the permeate comprises dynamically injecting the bicarbonate medium into the permeate pipeline at an injection rate with the adjustment pump, wherein the injection rate is dynamically adjusted based on a measured pH level of the permeate as measured by the pH sensor within the permeate pipeline after the bicarbonate medium has been injected such that the measured pH level remains above a target value. In some embodiments, the third filtering apparatus cleans the membrane by adjusting a pH level of the hot water to 12 with sodium hydroxide and flushing the pH adjusted hot water through the membranes. In some embodiments, the membrane is coupled together with an input and a plurality of outputs within a self-contained skid. In some embodiments, the system further comprises additional membranes, wherein the membranes are composed of material that filters suspended solids having diameters greater than between 0.01 and 0.1 microns. In some embodiments, a first screen of the screens has apertures between 0.5 to 2 millimeters in diameter and a second screen of the screens has apertures between 100 to 250 microns in diameter. In some embodiments, the static bag filter includes pores having diameters between 400 to 500 microns. In some embodiments, filtering the first set of solids further comprises running the slurry medium through a shaker deck having one or more shaker screens. In some embodiments, the recovery apparatus refluxes a portion of the recovered ammonia from at least one of the condenser columns back into the stripping columns through a feedback channel in order to increase the concentration of the recovered ammonia. In some embodiments, the recovery apparatus includes a heat exchanger and the steam stripping comprises generating steam from the permeate by heating the permeate with a heat exchanger coupled to the stripping columns. In some embodiments, the system further comprises a reverse osmosis system that receives wastewater exiting the stripping columns after the ammonia has been recovered and separates salt from the wastewater. In some embodiments, the system further comprises a cleaning system that cleans the stripping columns and associated piping with acidic and/or basic solutions to remove organic and/or inorganic precipitates.

A third aspect is directed to a method of recovering ammonia from wastewater. The method comprises filtering a first set of solids from an input slurry medium including ammonia by pressing the slurry medium through one or more screens of a screw press, wherein each subsequent one of the screens through which the slurry medium is forced has smaller apertures than the previous one of the screens, wherein filtering the first set of solids further comprises running the slurry medium through a shaker deck having one or more shaker screens, failsafe filtering a second set of solids from the input slurry medium as output by the screw press with a static bag filter and pumping resulting filtrate to one or more storage tanks, for each of a plurality of batches of the filtrate, filtering a third set of solids from the batch of the filtrate without using coagulating or flocculating polymers by forcing the batch through a plurality of ultra-fine membranes producing a remaining permeate, wherein each subsequent one of the membranes through which the batch is forced has smaller pores than the previous one of the membranes and cleaning the membranes after the batch has been completely filtered by the membranes by flushing hot water through the membranes before a next one of the batches is forced through the membranes, cleaning the membranes by adjusting a pH level of the hot water to 12 with sodium hydroxide and flushing the pH adjusted hot water through the membranes after completion of at least one of the batches, adjusting a pH level of the permeate by mixing the permeate with a bicarbonate medium when the pH level is below a threshold value and pumping the adjusted permeate to one or more stripping columns via a permeate pipeline, wherein adjusting the pH level of the permeate comprises dynamically injecting the bicarbonate medium into the permeate pipeline at an injection rate, wherein the injection rate is dynamically adjusted based on a measured pH level of the permeate within the permeate pipeline after the bicarbonate medium has been injected such that the measured pH level remains above a target value, thermo-physically recovering the ammonia from the adjusted permeate by steam stripping the adjusted permeate in one or more stripping columns thereby producing vaporized ammonia, channeling the vaporized ammonia to one or more condensing columns and condensing the vaporized ammonia in the condensing columns without acid scrubbing the vaporized ammonia, wherein the steam stripping comprises generating steam from the permeate by heating the permeate with a heat exchanger coupled to the stripping columns and pumping wastewater exiting the stripping columns after the ammonia has been recovered into a reverse osmosis system that separates salt from the wastewater. In some embodiments, the method further comprises cleaning the stripping columns and associated piping with acidic and/or basic solutions to remove organic and/or inorganic precipitates.

DETAILED DESCRIPTION OF THE INVENTION

Embodiments described herein are directed to a method for exclusively concentrating the valuable nutrient, nitrogen, from wastewater and/or digester effluents while separating the remaining components into various side streams which may have additional value or be suitable for inexpensive disposal due to the processing. The process described herein relates to a system for filtering progressively finer solids from a slurry containing a mix of solids of different sizes and compositions along with dissolved solids, including, but not limited to, bacterial cells, salts, minerals, organic molecules, and ammonia, and then ultimately distilling the ammonia to make a concentrated solution. It is able to be directed to industries producing ammonia-rich wastewaters derived from mixed organic wastes which may be contaminated with a variety of non-biodegradable materials, such as fibers, plastics, metals, stone, shell, and bacterial biomass. In particular, wastewaters derived from food production and processing, anaerobic digestion, wastewater treatment, and other biological treatment processes are ideally suited to treatment via this process.

The primary product from this process is a high-concentration ammonia solution that can be applied to agricultural, horticultural, and other industrial uses. The process described is able to provide the benefit of not chemically altering the ammonia. Rather, it prepares the solution for ammonia distillation, a process that vaporizes ammonia by shifting the equilibrium to the non-ionized form of ammonia through a combination of pH and temperature adjustment, and subsequently condenses the ammonia laden vapors into the final product, which is transferred to a suitable storage vessel. Suspended solids in the slurry may cause foaming and fouling of the distillation column. Therefore, they are removed prior to distillation. These upstream filtration processes also concurrently produce a concentrated, active microbial slurry, ideally suited for inoculating biological processes such as anaerobic digestion, as well as a suspended-solids-and-nitrogen-free liquid that reduces the cost of disposing of the leftover waste water. Both of these byproduct streams can be further treated to reclaim additional value from the water, organic carbon, biomass, or other constituents. Although as described herein, the recovery relates primarily to ammonia, the recovery of other chemicals using the described method is contemplated.

Figure 1:
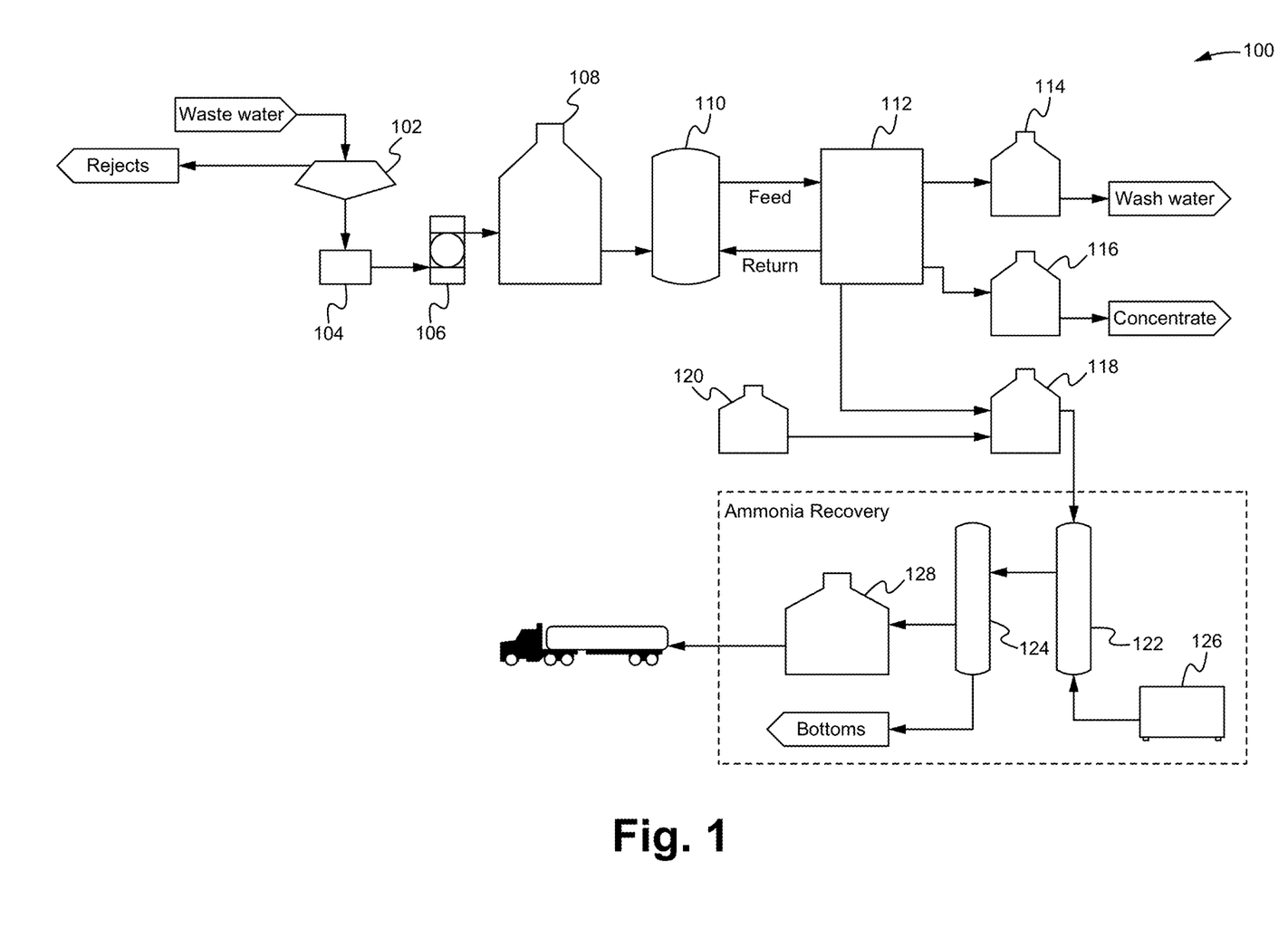
FIG. 1 illustrates a nutrient recovery system according to some embodiments.
Figure 4:
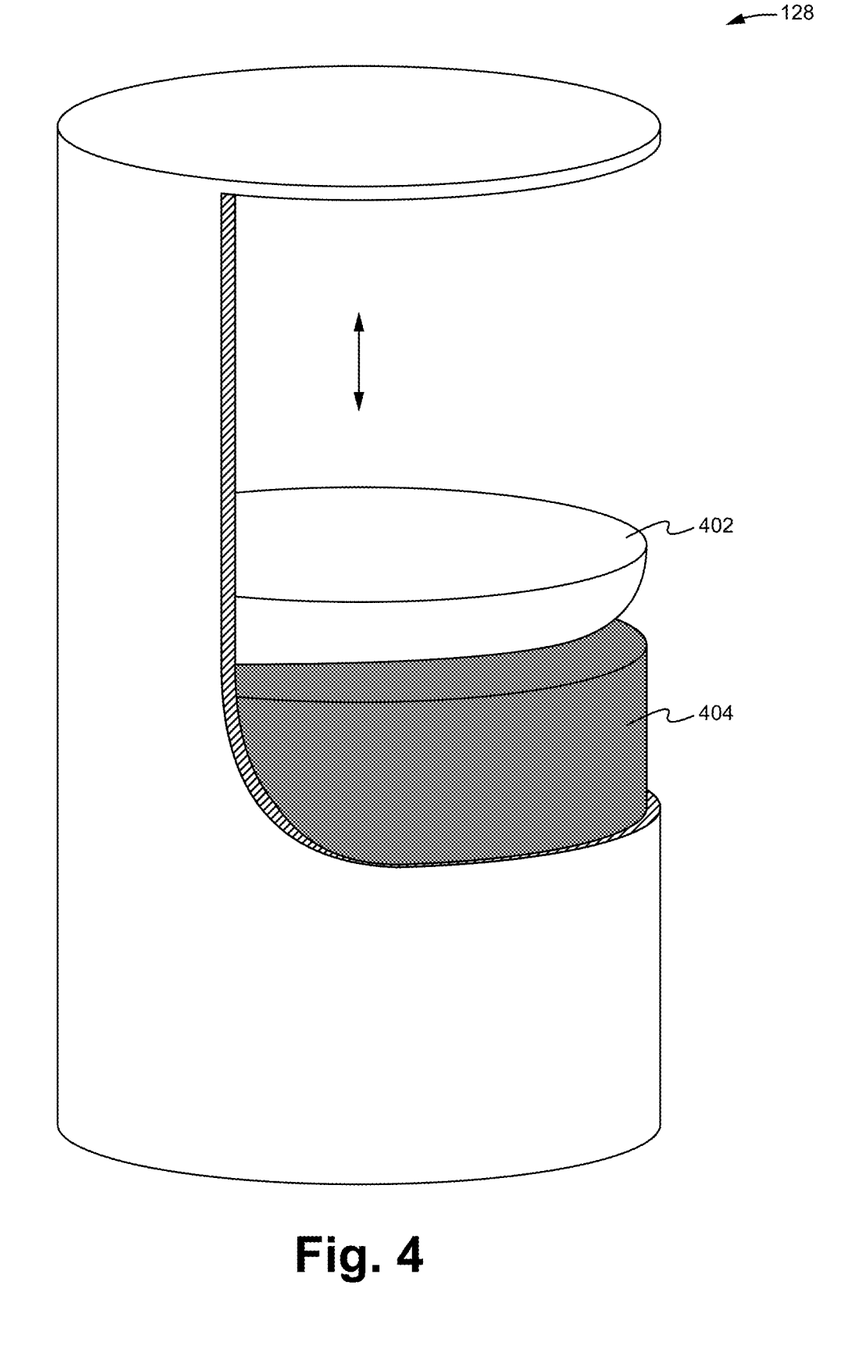
FIG. 4 illustrates a product tank including a floating barrier according to some embodiments.

FIG. 1 illustrates a nutrient recovery system 100 according to some embodiments. As shown in FIG. 1, the system 100 comprises a vibration filtering system 102, a sump system 104, a static filtering system 106, one or more storage tanks 108, one or more batch tanks 110 (e.g. each having a feed and a return line), a membrane filtration system 112, one or more wash water containment tanks 114, one or more by-product concentrate staging tanks 116, one or more permeate storage tanks 118, one or more bicarbonate solution tanks 120, one or more stripping columns 122, one or more condensing columns 124, a heat generating system 126 and one or more product storage tanks 128. In some embodiments, as shown in FIG. 4, the product storage tanks 128 are able to comprise a floating vapor barrier 402 that is allowed to rise and fall with changes in the liquid level 404 while minimizing evaporation. Alternatively, one or more of the above elements are able to be omitted, replaced and/or duplicated within the system 100.

The static filtering system 106 is able to comprise one or more static bag filters. The membrane filtration system 112 is able to comprise one or more pumps, valves, cleaning fluid tanks, instrumentation and membrane filters. In some embodiments, the system 112 is packaged into a self-contained skid. Further, as shown in FIG. 1, the membrane filtration system 112 is able to have a single inlet connection for the feed from the batch tanks 110 and a plurality of outlets for a return line to be coupled with the batch tanks 110, a wash water discharge line to be coupled to the wash water containment tanks 114, a concentrate discharge line to be coupled to the staging tanks 116 for the concentrated by-product of filtration left at the end of the batch (in some embodiments concentrate is able to be returned to upstream biological processes such as an anaerobic digester or it is able to be sent for further processing or utilization off site), and a permeate discharge line coupled to the permeate storage tanks 118 (where the pH may be adjusted by adding a bicarbonate solution from the solution tanks 120). The columns 122 are able to be steam stripping columns and the heat generating system 126 is able to comprise one or more steam generators.

Figure 6:
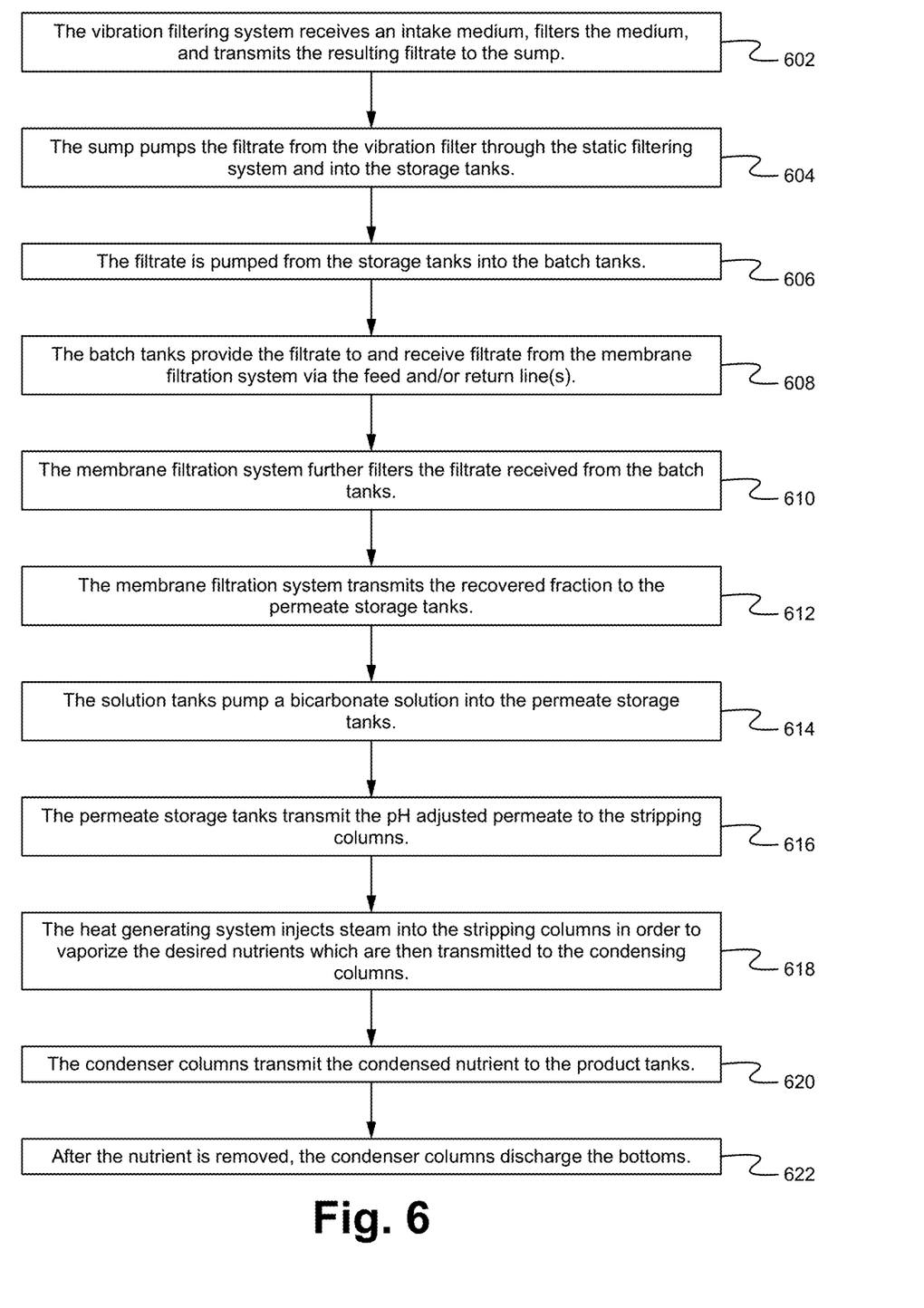
FIG. 6 illustrates a method of nutrient recovery according to some embodiments.

FIG. 6 illustrates a method of nutrient recovery according to some embodiments. As shown in FIG. 6, the vibration filtering system 102 receives an intake medium (e.g. wastewater, digester effluent, slurry or other medium), filters the medium in order to remove large, coarse, and often compressible solids (such as fibers, plastics, and textiles) greater than a screen aperture size as rejects, and transmits the resulting filtrate to the sump 104 at the step 602. The rejected solids from the screening are able to be removed and either returned to the treatment headworks, disposed, utilized off-site without further treatment, or input into further downstream processes. The solids fraction from this process typically makes up less than 5% of the mass of the input material. In some embodiments, the vibration filtering system 102 comprises one or more vibrated screens, one or more rotary screens and/or one or more screw presses (e.g. having one or more aperture sizes) such that the system 102 is able to simultaneously filter and de-water solids of the medium. For example, the vibration filtering system 102 is able to comprise one or a plurality of screw presses having progressively smaller screen aperture sizes (e.g. between 0.5-2 mm, 100-250 microns, 25-50 microns in diameter). Alternatively, one or more of the presses are able to have the same aperture sizes. In some embodiments, in addition or in lieu of the screen presses, the system 102 is able to utilize one or more shaker deck screens (with a single or double deck (if size classification is desired for the solids fraction)). In another embodiment, a rotary screen is able to replace and/or supplement one or more of the shaker deck screens. Alternatively, the vibration filtering system 102 and/or step 602 is able to be omitted.

The sump 104 contains and pumps the filtrate from the vibration filter 102 through the static filtering system 106 (e.g. through one or more filtration bags) and into the storage tanks 108 at the step 604. In some embodiments, the static filtering system 106 comprises one or more static bag filters (and/or other in-line filters) with larger pores than the finest screen of the vibration filtering system 102 (e.g. 500 micron) that filters the sump 104 output as a failsafe. Specifically, the static filtering system 106 is able to keep any stray large particles from getting further downstream where they can cause problems, although most of the particles will pass through the screen during normal operation. Thus, the static filter 106 provides the benefit of protecting the downstream equipment. Alternatively, the sump 104 and/or static filtering system 106 and/or step 604 is able to be omitted.

The filtrate is then transferred (e.g. in batches) from the storage tanks 108 into the batch tanks 110 at the step 606. The batch tanks 110 provide the filtrate to and receive filtrate from the membrane filtration system 112 via the feed and/or return line(s) at the step 608. The membrane filtration system 112 then further filters the filtrate (e.g. liquid slurry) received from the batch tanks 110 at the step 610. Specifically, the membrane filtration system 112 is able to remove the finest suspended solids (e.g. all suspended solids), including cellular biomass (0.5-5 micron in diameter). In some embodiments, membrane filtration system comprises on or more membranes through which the filtrate is forced having pores between 0.01 and 0.1 microns in diameter, making them ultra or micro filtration membranes. In some embodiments, the membranes are composed of any material which effectively removes suspended solids between 0.01 and 0.1 microns while maintaining good flow characteristics and high flux rates. The membranes are able to be selected to balance a trade-off between the clarity of the resulting liquid (permeate) and the flux through the selected membrane. A similar trade-off can be made between the recovery rate (i.e. the mass fraction of the recovered liquid versus the rejected solids) and average permeate flow rate. In practice recovery rates of 60-80% are typical.

After filtering, the membrane filtration system 112 is able to transmit the recovered fraction (permeated fraction) to the permeate storage tanks 118 at the step 612. In some embodiments, the membrane filtration system 112 returns a portion of the permeated filtrate to the batch tanks 110 via the return line for further filtration. In some embodiments, the system 112 transmits a filtered/rejected portion to the concentrate tanks 116 (e.g. to return it to the biological treatment process as an inoculant or utilized as an input into further downstream processes). The membranes will build up a fouling layer over time which must be removed to improve the longevity and efficacy of the membranes. As a result, in some embodiments the method further comprises a clean-in-place (CIP) routine in the membrane filtration system 112. Specifically, the routine is able to comprise hot water cleaning after each batch with alkaline washing (e.g. every two to four weeks depending on flow characteristics). For example, in some embodiments the water is between 80 and 140 degrees Fahrenheit. Alternatively, higher or lower temperatures are able to be used. The pH of hot water is usually raised to 12 with sodium hydroxide (or other cleaning solution) for the alkaline wash, and the membranes are flushed with hot water after the alkaline wash to prevent carryover of wash chemicals into the final product. The wash water is able to be diverted by the system 112 to a neutralization/wash water tank 114 prior to discharge to the sewer. In another embodiment, the wash water is blended with the rest of the wastewater prior to discharge.

In some embodiments, the method further comprises an additional or substitute solids-removal procedure comprising evaporating the ammonia and water (along with any other volatile compounds) from the filtrate, and re-condensing these constituents to purify them and leave behind any non-volatile organics, such as salts, minerals, and all suspended solids. This evaporation/re-condensing is able to supplement or substitute for the membrane filtration 112, the static filtration 106 and/or the vibration filtration 102 (and occur before and/or after any or all of those filtration steps). Alternatively or in addition, other suspended solids removal technology may be employed, so long as the resulting liquid is at least 99% free of suspended solids. For example, the method is able to include centrifuges/decanters, belt filter presses, dissolved air floatation systems, filter presses, and/or settling basins. Any such technique or combination of techniques may be employed so long as it does not adulterate the wastewater with non-natural compounds, such as polymers.

The solution tanks 120 pump a bicarbonate solution (e.g. for adjusting the pH of the permeate) into the permeate storage tanks 118 at the step 614. The permeate storage tanks 118 transmit the pH adjusted permeate to the stripping columns 122 for evaporating (and subsequently condensing the ammonia) at the step 616. Alternatively or in addition to step 614, the bicarbonate solution is able to be directly injected into the permeate as it is pumped from the permeate tanks to the stripping columns 122 (as described in FIG. 2 below). The heat generating system 126 injects steam into the stripping columns 122 in order to vaporize the desired nutrients (e.g. ammonia) which are then transmitted to the condensing columns 124 (for receiving and condensing evaporated gas/vapor) at the step 618. In some embodiments, the heat generating system 126 is able to be replaced and/or supplemented with a heating system that heats the permeate itself in the stripping columns 122 to create the steam to strip/vaporize the desired nutrients (as described in FIG. 3 below). In some embodiments, the system 100 further comprises a cold water circulation system coupled with the condensing columns 124 that cool the ammonia laden steam in order to condense it. In such embodiments, the cooling water is able to be pumped through a cooling tower to limit the use of fresh water.

In the stripping/condensing process the liquid/permeate is typically pumped slowly and continuously into the steam stripping columns 122 of the distillation system, where steam extracts the nutrient (e g ammonia) into the vapor phase, which is then cooled and condensed by the condenser columns 124 to form the final concentrated solution. In some embodiments, a portion of the condensate may be returned to the stripping column (e.g. "reflux" via a reflux line between the stripping 122 and condenser columns 124 (not shown)) to increase the final concentration. The efficacy of the steam stripping unit depends to some extent on the initial pH of the liquid. Therefore, the liquid may have its pH adjusted slightly with a mild, natural alkaline additive. In lab testing, it has been determined that at the concentrations tested (1000-3000 mg/L ammonia), a final pH of 8.5-9.0 was sufficiently high to effect over 95% recovery of ammonia. However, without any pH adjustment, at a starting pH of 7.5, over 75% of the ammonia was recovered. Therefore, when the initial pH is sufficiently high and/or the required ammonia recovery is sufficiently low, no pH adjustment may be required such that the solution tank 120 and/or step 614 is able to be omitted. However, when higher ammonia recoveries are required and/or initial pH is lower, mild, natural alkaline agents such as soda ash or other natural carbonates may be sufficient to raise the pH to the necessary level. In some embodiments, the pH of the liquid is adjusted just prior to or during injection of the liquid into the stripping column 122 in order to minimize ammonia volatilization and losses outside of the column 122.

Figure 5:
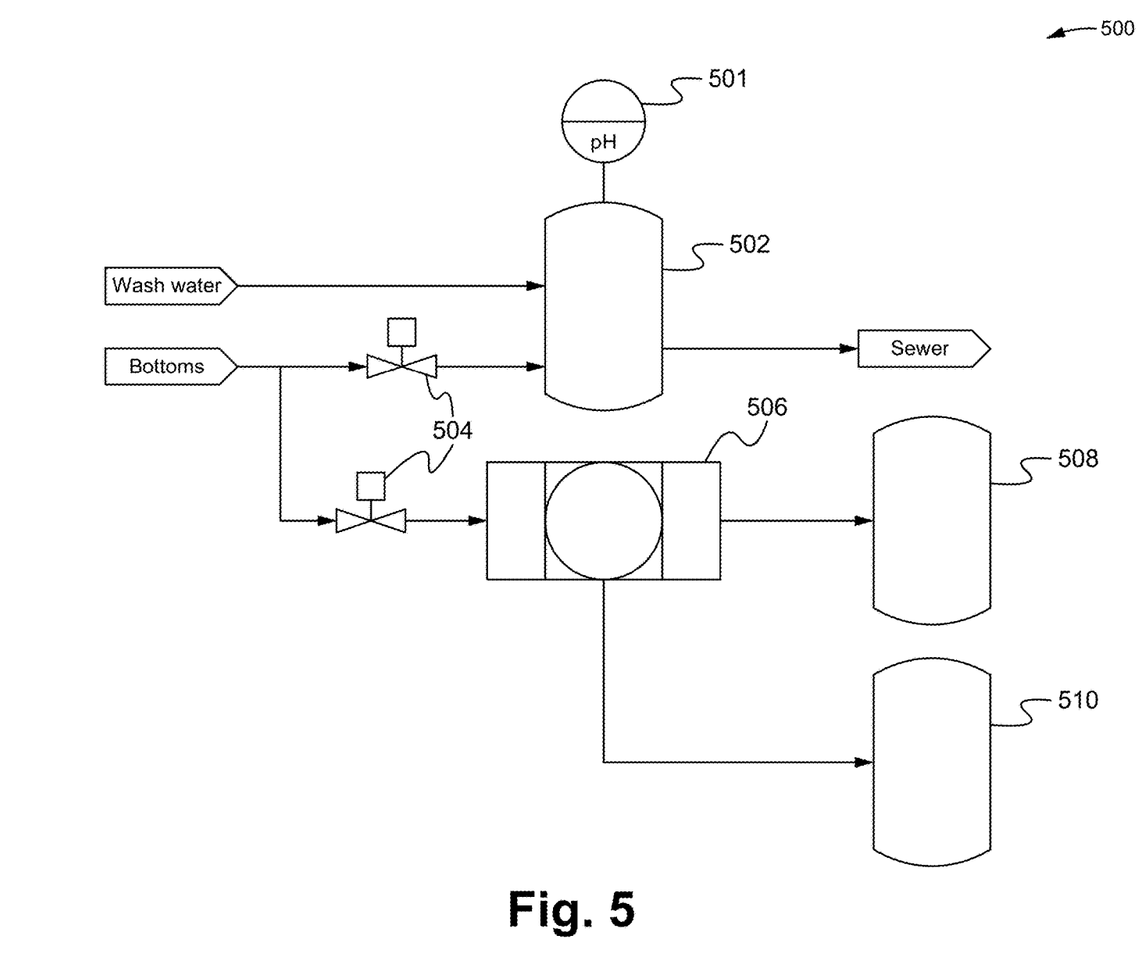
FIG. 5 illustrates another nutrient recovery system including a byproduct system according to some embodiments.

During pilot testing, the stripping column 122 was found to develop two kinds of scaling that could foul the column 122. One was a white acid-soluble scale, most likely consisting of precipitated carbonates. The other was a dark grey or black, greasy, alkaline-soluble scale, most likely consisting of coagulated organics. Accordingly, in some embodiments the method further comprises a dual CIP routine for removing the scale. In such embodiments, first an acid wash is re-circulated through the column 122 to remove the carbonate scaling. Then a hydroxide wash is re-circulated to remove the organic scaling. These wash waters are able to be blended in the neutralization tank or sump (e.g. tank 502) prior to discharge. The column 122 is then able to be flushed at the end of the CIP cycle to avoid carryover of acids or bases and the flush water is disposed. In some embodiments, the flush water is blended with all other waste waters prior to disposal.

The condenser columns 124 then transmit the condensed nutrient (e g ammonia) to the product tanks 128 for later shipment at the step 620. In some embodiments, the product tanks 128 are enclosed for storage of the final concentrated ammonia product. This minimizes volatilization of the valuable compounds by minimizing mass transfer to the vapor phase. In some embodiments, a floating barrier 402 (as shown in FIG. 4) is added to the product storage vessel 128 to create a physical barrier to evaporation which is able to fluctuate with the changing level of the vessel, as product is added or extracted for transfer to the final application site.

After the ammonia is removed, the condenser columns 124 are able to discharge the ammonia-free bottoms directly to the sewer, a staging tank or sent to further downstream processing at the step 622. In some embodiments, some of the condensed ammonia solution may be re-fluxed through the condensing/stripping columns 122, 124 to achieve higher final concentrations. In some embodiments, the bottoms may need to be cooled and pH adjusted prior to disposal, depending on the local regulatory requirements. A single wastewater disposal vessel (e.g. vessel 502) is able to be employed to blend all wastewater streams from the process as well as other adjacent processes. In some embodiments, the bottoms are collected separately and further processed prior to disposal. Where a market exists for grey water, the bottoms are able to be chlorinated or otherwise treated for beneficial reuse. Where salt disposal limitations exist, the bottoms are able to be treated with reverse osmosis to further fractionate the liquid into a brine and a reclaimed water fraction (as described in FIG. 5 below).

As a result, the method provides the advantage of enabling the recovery of a desired nutrient without the use of harsh chemicals. Specifically, the method described herein is able to process wastewater that is high in ammonia (commonly over 1,000 mg/L and often over 2,500 mg/L) and also high in other dissolved solids as well as fine and coarse suspended solids. Sources of such wastewaters include agricultural processing facilities (such as dairies, piggeries, and egg production facilities), anaerobic digesters treating various feedstocks (such as sewage sludge, food waste, and animal manure), pharmaceutical manufacturing facilities, and others. The ammonia from these wastewaters has high value as an organic fertilizer, provided that the fertilizer does not contain undesirable or toxic compounds and is of sufficient concentration to justify the transportation and handling costs. The value of this ammonia is particularly high in organic agriculture which values naturally derived resources over man-made ones. Altogether, the system constitutes an effective, low-impact method for treating wastewaters in order to reduce the downstream treatment requirements (i.e. by removing and recovering the volatile constituents such as suspended solids, dissolved organics, and ammonia), creating concentrated microbial inocula that can benefit the upstream biological processes such as anaerobic digestion, and extracting and concentrating the highly valuable ammonia in a form that remains natural and unadulterated.

Figure 2:
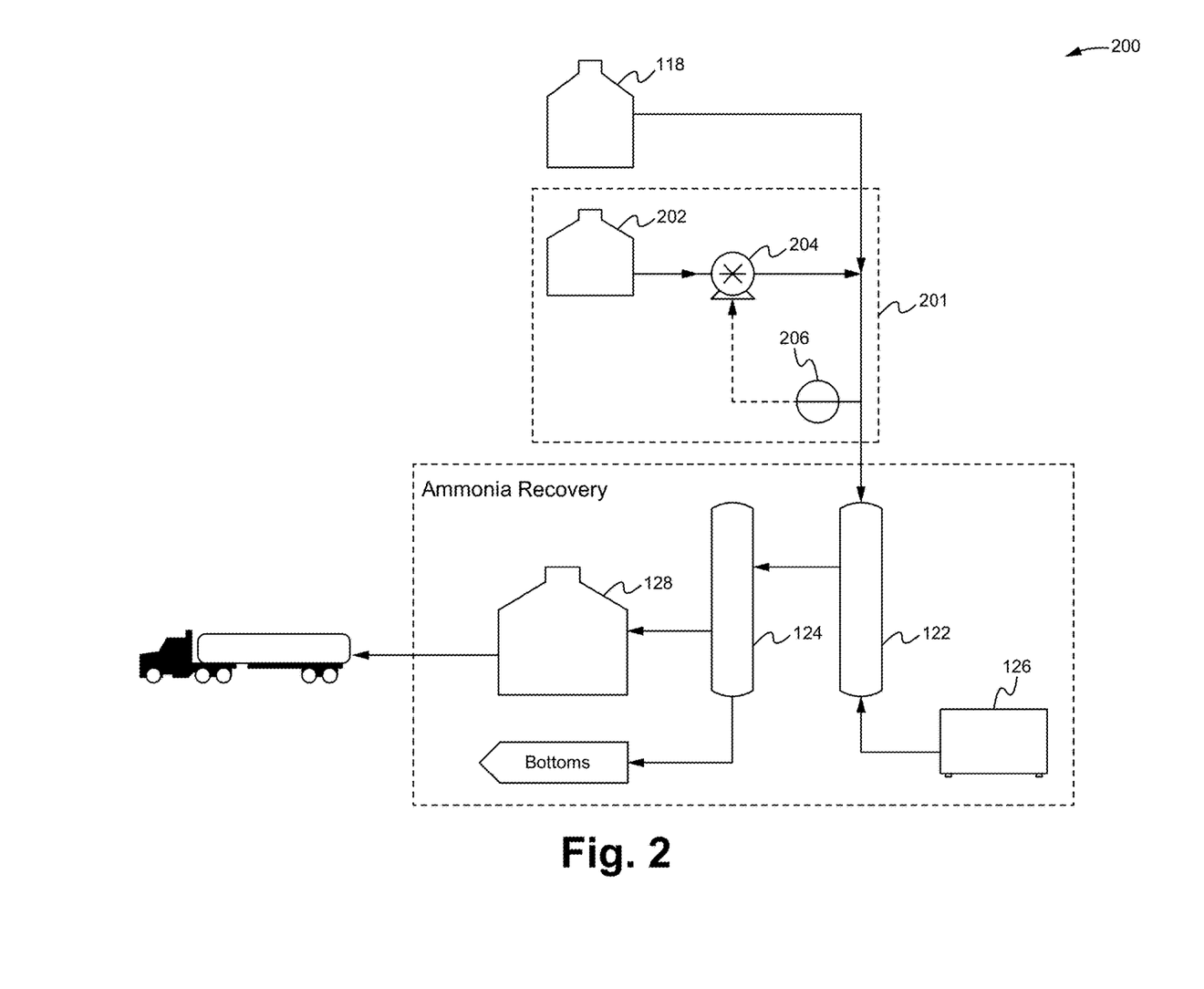
FIG. 2 illustrates another nutrient recovery system including a pH direct injection system according to some embodiments.

FIG. 2 illustrates another nutrient recovery system 200 including a pH direct injection system according to some embodiments. The recovery system 200 is substantially the same as the recovery system 100 except for the differences described herein. As shown in FIG. 2, instead of or in addition to the solution tank 120, the system 100 comprises an injection system 201 including a pump 204 coupled between a storage vessel 202 and the line between permeate storage tanks 118 and the stripping columns 122, and a pH sensor 206 (e.g. online pH probe) coupled between the line and the pump 204. In some embodiments, the vessel 202 is the solution tank 120. Alternatively, the vessel 202 is able to be separate from and/or in addition to the solution tank 120. In operation, the pump 202 pumps bicarbonate from the vessel 202 through a mixing port into the line with the permeate in order to adjust the pH level of the permeate. The pump 202 is able to monitor the pH level of the permeate as it moves from the storage tanks 118 to the stripping column 122 via the sensor 206 and dynamically adjust the rate at which the bicarbonate is added based on the sensed pH levels (e.g. increasing or decreasing the speed and/or volume pumped in order to achieve a desired pH level or range). In some embodiments, the bicarbonate is able to be mixed within the vessel 202 before it is metered into the permeate line.

Figure 3:
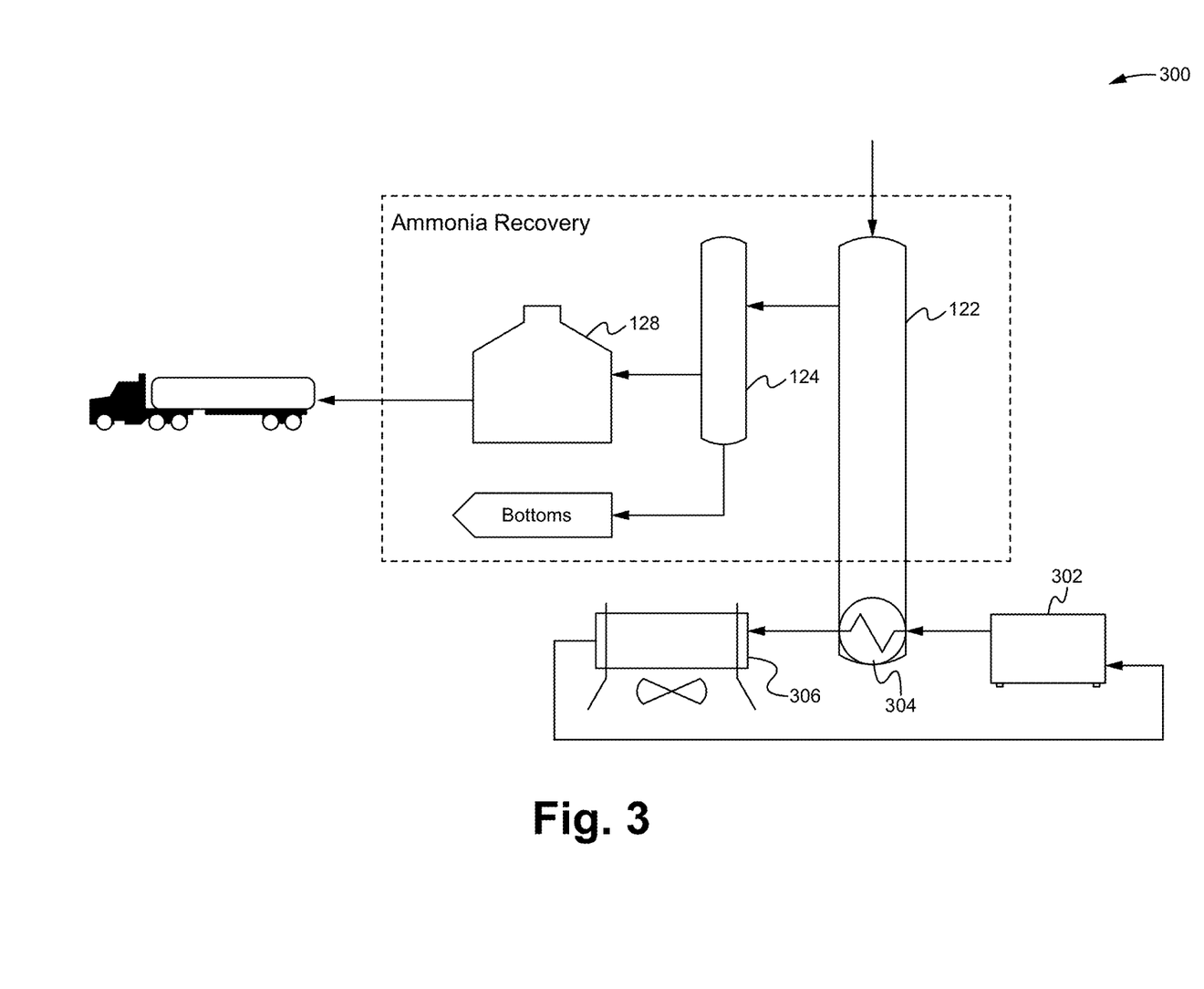
FIG. 3 illustrates another nutrient recovery system including a heating system according to some embodiments.

FIG. 3 illustrates another nutrient recovery system 300 including a heating system according to some embodiments. The recovery system 300 is substantially the same as the recovery system 100 except for the differences described herein. As shown in FIG. 3, the system 300 comprises a heat generator 302, a heat exchanger 304 and a cooler 306 (e.g. air, water or other cooler). In some embodiments, the cooler 306 is able to be omitted. In some embodiments, the heat generator 302 is able to be the heat generator 126. The heat exchanger 304 is able to be incorporated with (e.g. inside of or external to) the stripping column 122 and transfers heat from a heat generator 302 (e.g. a boiler, re-boiler or other heat generation/recovery system) into the column 122 to generate steam from the process fluid within the column 122. As a result, steam is able to be generated for the column 122 from the process fluid itself, rather than injecting steam made from clean water as in FIG. 1, which dilutes the final product. Specifically, the heat exchanger 304 transfers heat from the heat source 302 into the working fluid to create steam from the working fluid. The heating fluid within the heating system is able to comprise water, oil or other liquids. Upon exiting the column 122, the heating fluid is able to be subsequently cooled in the cooler 306 and then recycled through the heat source 302 in order to limit the consumption of water. When a sufficient source of fresh water is available, it is able to be discharged without cooling and/or the cooler 306 is able to be omitted.

FIG. 5 illustrates a wastewater management system 500 including a byproduct system according to some embodiments. The wastewater management system 500 is able to be utilized to collect and combine wash water from different cleaning processes (e.g. a system 100 as described previously) along with ammonia-free bottoms from the ammonia stripping columns and any other wastewater streams generated. The system 500 is able to be combined with and/or substantially the same as the recovery system 100 except for the differences described herein. As shown in FIG. 5, the system 500 comprises a sump 502 having a pH monitoring sensor 501 that is able to: receive wastewater from various sources within the process including the wash waters from the wash water containment tank 114 and bottoms from the stripping column 124; monitor and adjust the pH according to the needs of the sanitation district; and meter the blended wastewaters to the sewer. Alternatively or in addition, the system 500 further comprises one or more selection valves 504, a reverse osmosis system 506, a brine storage tank 508 and a clean water tank 510. Specifically, the valves 504 are able to selectively divert the bottoms from the condensing columns 124 to sump 502 and/or the reverse osmosis system 506 for additional separation of the salt from the remaining wastewater. The concentrated brine is able to be stored in the brine storage tank 508 for proper disposal, while the clean water is stored in the clean water tank 510 for beneficial reuse. In some embodiments, the stripping column 124 is cleaned by refluxing a basic and/or acidic solution through the column and associated piping to remove precipitated solids which may be organic and/or inorganic in nature.

The system 100 described herein provides numerous benefits. Specifically, the system provides a method of recovering a low-salt, concentrated ammonia solution from biologically treated wastewaters without adding synthetic chemicals or employing chemical reactions. Most solids removal processes rely on addition of coagulating and/or flocculating chemicals (i.e. polymers) to aid in the removal of fine solids. The method described herein avoids the use of polymers by relying, instead, on ultra-fine (ultra filtration) membranes. Also, the method omits any strong acids or bases and involves steam stripping of the wastewater, which turns the process from a series of chemical reactions, to a thermo-physical process. This is critical for preserving the natural origin of the ammonia and eliminating mineral salts from the final product. Another benefit of the process is that wasted heat available from the combustion of biogas from an anaerobic digester, as well as other co-located heat sources that may be available, can be utilized to carry out the ammonia distillation. The amount of heat required to distill ammonia is much lower than the amount required to evaporate water to achieve equal final nitrogen concentrations. For a digester processing substrates with over 5% solids content, only 20-50% of the co-generated heat is required to maintain digester temperature. This results in the availability of 1,000-2,000 BTU per gallon of residual slurry. It requires about 9,000 BTU to evaporate a gallon of water, but it only requires 1,000-1,500 BTU to distill out the ammonia from a gallon of filtered slurry. Therefore, the energy balance is much more favorable for distillation of ammonia than evaporation of water.

The present invention has been described in terms of specific embodiments incorporating details to facilitate the understanding of principles of construction and operation of the invention. Such reference herein to specific embodiments and details thereof is not intended to limit the scope of the claims appended hereto. For example, although for the sake of brevity elements are described as tanks herein, it is understood that the elements are able to comprise one or more valves, inlets, outlets and/or pumps in order to effectuate the movement of the medium into and out of the tanks as described. Additionally, although described separately, the features of the systems described in two or more of FIGS. 2, 3 and 5 are able to be combined into a single system including two or all three of the described features as well as those in FIG. 1. It will be readily apparent to one skilled in the art that other various modifications may be made in the embodiment chosen for illustration without departing from the spirit and scope of the invention as defined by the claims.

What is claimed is:

1. A method of recovering ammonia from wastewater, the method comprising:
   filtering a first set of solids from an input slurry medium including ammonia by pressing the slurry medium through a plurality of screens of a screw press, wherein each subsequent one of the screens through which the slurry medium is forced has smaller apertures than the previous one of the screens;
   filtering a second set of solids from the input slurry medium as output by the screw press with a static bag filter and pumping resulting filtrate to one or more storage tanks;
   for each of a plurality of batches of the filtrate:
      filtering a third set of solids from the batch of the filtrate without using coagulating or flocculating polymers by forcing the batch through at least one ultra-fine membrane producing a remaining permeate; and
      cleaning the membrane after the batch has been completely filtered by flushing water through the membrane before a next one of the batches is forced through the membrane, wherein the water is between 80 and 140 degrees Fahrenheit;
   adjusting a pH level of the remaining permeate by mixing the remaining permeate with a bicarbonate medium when the pH level is below a threshold value forming an adjusted permeate and pumping the adjusted permeate to one or more stripping columns via a permeate pipeline; and
   thermo-physically recovering the ammonia from the adjusted permeate by steam stripping the adjusted permeate in the one or more stripping columns thereby producing vaporized ammonia, channeling the vaporized ammonia to one or more condensing columns and condensing the vaporized ammonia in the condensing columns without acid scrubbing the vaporized ammonia.

2. The method of claim 1, wherein adjusting the pH level of the remaining permeate comprises dynamically injecting the bicarbonate medium into the permeate pipeline at an injection rate, wherein the injection rate is dynamically adjusted based on a measured pH level of the adjusted permeate within the permeate pipeline after the bicarbonate medium has been injected such that the measured pH level remains above a target value.

3. The method of claim 1, further comprising cleaning the membrane by adjusting a pH level of the water to 12 with sodium hydroxide and flushing the pH adjusted water through the membrane.

4. The method of claim 3, wherein the membrane is a part of a membrane system positioned within a skid and has an inlet for receiving the batches and a plurality of outputs for outputting the permeate.

5. The method of claim 4, further comprising additional ultra-fine membranes that are a part of the membrane system, wherein the additional ultra-fine membranes are composed of pores having diameters between 0.01 and 0.1 microns.

6. The method of claim 1, wherein a first screen of the screens has apertures between 0.5 to 2 millimeters in diameter and a second screen of the screens has apertures between 100 to 250 microns in diameter.

7. The method of claim 1, wherein the static bag filter includes pores having diameters between 400 to 500 microns.

8. The method of claim 1, wherein filtering the first set of solids further comprises running the slurry medium through a shaker deck having one or more shaker screens.

9. The method of claim 1, further comprising refluxing a portion of the ammonia resulting from at least one of the one or more condensing columns back into the one or more stripping columns in order to increase the concentration of the vaporized ammonia.

10. The method of claim 1, wherein the steam stripping comprises generating steam from the adjusted permeate by heating the adjusted permeate with a heat exchanger coupled to the one or more stripping columns.

11. The method of claim 1, further comprising pumping wastewater exiting the one or more stripping columns after the ammonia has been recovered into a reverse osmosis system that separates salt from the wastewater.

12. The method of claim 1, further comprising cleaning the one or more stripping columns and associated piping with acidic and/or basic solutions to remove organic and/or inorganic precipitates.

13. An ammonia wastewater recovery system, the system comprising:
a first filtering apparatus including a screw press that filters a first set of solids from an input slurry medium including ammonia by pressing the slurry medium through a plurality of screens of the screw press, wherein each subsequent one of the screens through which the slurry medium is forced has smaller apertures than the previous one of the screens;
a second filtering apparatus coupled with an output of the first filtering apparatus and including a sump, one or more storage tanks and a static bag filter, wherein the sump pumps the input slurry medium as output by the first filtering apparatus through the static bag filter thereby removing a second set of solids from the input slurry medium and pumps resulting filtrate output by the static bag filter into the one or more storage tanks;
a third filtering apparatus coupled with an output of the storage tanks via one or more input valves and including one or more output valves and at least one ultra-fine membrane, wherein for each of a plurality of batches of the filtrate received from the storage tanks the third filtering apparatus:
filters a third set of solids from the batch of the filtrate without using coagulating or flocculating polymers by forcing the batch through the at least one ultra-fine membrane producing a remaining permeate; and
cleans the membrane after the batch has been completely filtered by the at least one ultra-fine membrane by flushing water through the at least one ultra-fine membrane before a next one of the batches is forced through the at least one ultra-fine membrane, wherein the water is between 80 and 140 degrees Fahrenheit;
a pH adjustment apparatus coupled with the third filtering apparatus and including an adjustment tank and an adjustment pump, wherein the pH adjustment apparatus adjusts a pH level of the remaining permeate by mixing the remaining permeate with a bicarbonate medium when the pH level is below a threshold value forming an adjusted permeate and pumping the adjusted permeate to one or more stripping columns via a permeate pipeline; and
thermo-physical ammonia recovery apparatus including the one or more stripping columns coupled with one or more condensing columns, wherein the recovery apparatus recovers the ammonia from the adjusted permeate by steam stripping the adjusted permeate in the one or more stripping columns thereby producing vaporized ammonia, channeling the vaporized ammonia to the one or more condensing columns and condensing the vaporized ammonia in the one or more condensing columns without acid scrubbing the vaporized ammonia.

14. The system of claim 13, wherein the adjustment apparatus comprises an injection line coupled with the permeate pipeline and a pH sensor, and further wherein adjusting the pH level of the remaining permeate comprises dynamically injecting the bicarbonate medium into the permeate pipeline at an injection rate with the adjustment pump, wherein the injection rate is dynamically adjusted based on a measured pH level of the adjusted permeate as measured by the pH sensor within the permeate pipeline after the bicarbonate medium has been injected such that the measured pH level remains above a target value.

15. The system of claim 13, wherein the third filtering apparatus cleans the membrane by adjusting a pH level of the water to 12 with sodium hydroxide and flushing the pH adjusted water through the membranes.

16. The system of claim 15, wherein the membrane is coupled together with an input and a plurality of outputs within a self-contained skid.

17. The system of claim 16, further comprising additional membranes, wherein the membranes are composed of material that filters suspended solids having diameters greater than between 0.01 and 0.1 microns.

18. The system of claim 13, wherein a first screen of the screens has apertures between 0.5 to 2 millimeters in diameter and a second screen of the screens has apertures between 100 to 250 microns in diameter.

19. The system of claim 13, wherein the static bag filter includes pores having diameters between 400 to 500 microns.

20. The system of claim 13, wherein filtering the first set of solids further comprises running the slurry medium through a shaker deck having one or more shaker screens.

21. The system of claim 13, wherein the recovery apparatus refluxes a portion of the ammonia resulting from at least one of the one or more condenser columns back into the one or more stripping columns through a feedback channel in order to increase the concentration of the recovered ammonia.

22. The system of claim 13, wherein the recovery apparatus includes a heat exchanger and the steam stripping comprises generating steam from the adjusted permeate by heating the adjusted permeate with a heat exchanger coupled to the one or more stripping columns.

23. The system of claim 13, further comprising a reverse osmosis system that receives wastewater exiting the one or more stripping columns after the ammonia has been recovered and separates salt from the wastewater.

24. The system of claim 13, further comprising a cleaning system that cleans the one or more stripping columns and associated piping with acidic and/or basic solutions to remove organic and/or inorganic precipitates.

25. A method of recovering ammonia from wastewater, the method comprising:
filtering a first set of solids from an input slurry medium including ammonia by pressing the slurry medium through a plurality of screens of a screw press, wherein each subsequent one of the screens through which the slurry medium is forced has smaller apertures than the previous one of the screens, wherein filtering the first set of solids further comprises running the slurry medium through a shaker deck having one or more shaker screens;
filtering a second set of solids from the input slurry medium as output by the screw press with a static bag filter and pumping resulting filtrate to one or more storage tanks;
for each of a plurality of batches of the filtrate:
filtering a third set of solids from the batch of the filtrate without using coagulating or flocculating polymers by forcing the batch through a plurality of ultra-fine membranes producing a remaining permeate, wherein each subsequent one of the membranes through which the batch is forced has smaller pores than the previous one of the membranes; and cleaning the membranes after the batch has been completely filtered by the membranes by preparing an alkaline wash by adjusting a pH level of wash water to 12 with sodium hydroxide, flushing the alkaline wash through the membranes, and then flushing rinse water through the membranes before a next one of the batches is forced through the membranes, wherein the rinse water is between 80 and 140 degrees Fahrenheit;

adjusting a pH level of the remaining permeate by mixing the remaining permeate with a bicarbonate medium when the pH level is below a threshold value forming an adjusted permeate and pumping the adjusted permeate to one or more stripping columns via a permeate pipeline, wherein adjusting the pH level of the remaining permeate comprises dynamically injecting the bicarbonate medium into the permeate pipeline at an injection rate, wherein the injection rate is dynamically adjusted based on a measured pH level of the adjusted permeate within the permeate pipeline after the bicarbonate medium has been injected such that the measured pH level remains above a target value;

thermo-physically recovering the ammonia from the adjusted permeate by steam stripping the adjusted permeate in the one or more stripping columns thereby producing vaporized ammonia, channeling the vaporized ammonia to one or more condensing columns and condensing the vaporized ammonia in the condensing columns without acid scrubbing the vaporized ammonia, wherein the steam stripping comprises generating steam from the adjusted permeate by heating the adjusted permeate with a heat exchanger coupled to the one or more stripping columns; and pumping wastewater exiting the one or more stripping columns after the ammonia has been recovered into a reverse osmosis system that separates salt from the wastewater.

26. The method of claim 25, further comprising cleaning the one or more stripping columns and associated piping with acidic and/or basic solutions to remove organic and/or inorganic precipitates.

* * * * *